Sept. 24, 1957
J. D. BROWN
2,807,291
RECIPROCATING CARRIAGE FOR BAND SAWS
Original Filed Jan. 27, 1955
3 Sheets-Sheet 1
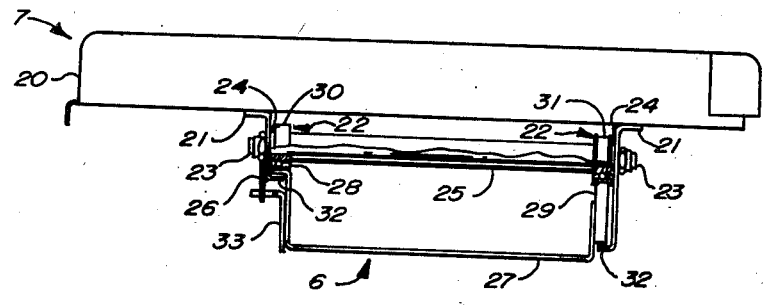
Fig. III
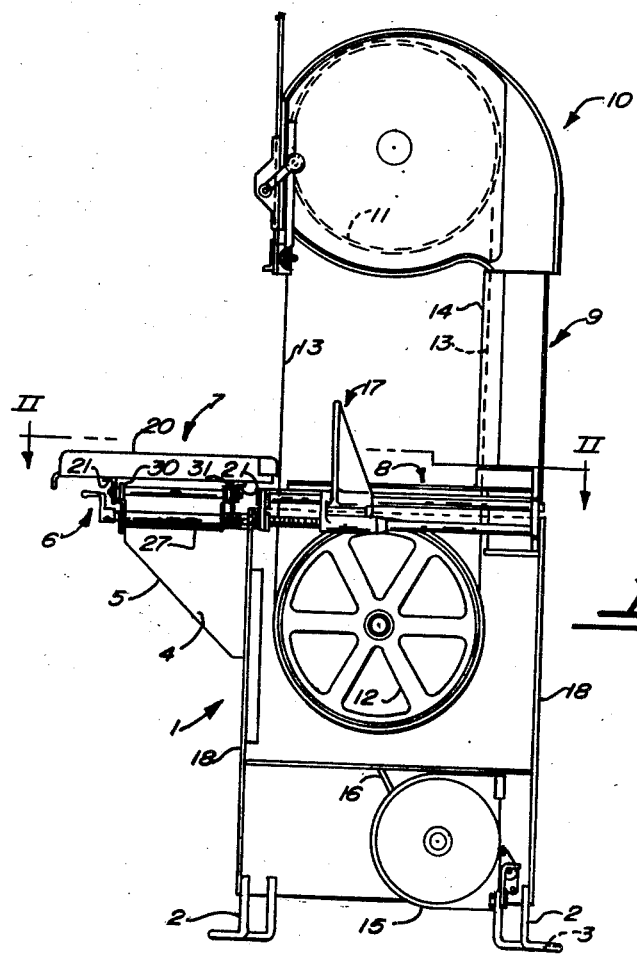
Fig. I
INVENTOR.
JAMES D. BROWN
BY
Marshall, Marshall & Yeasting
ATTORNEYS

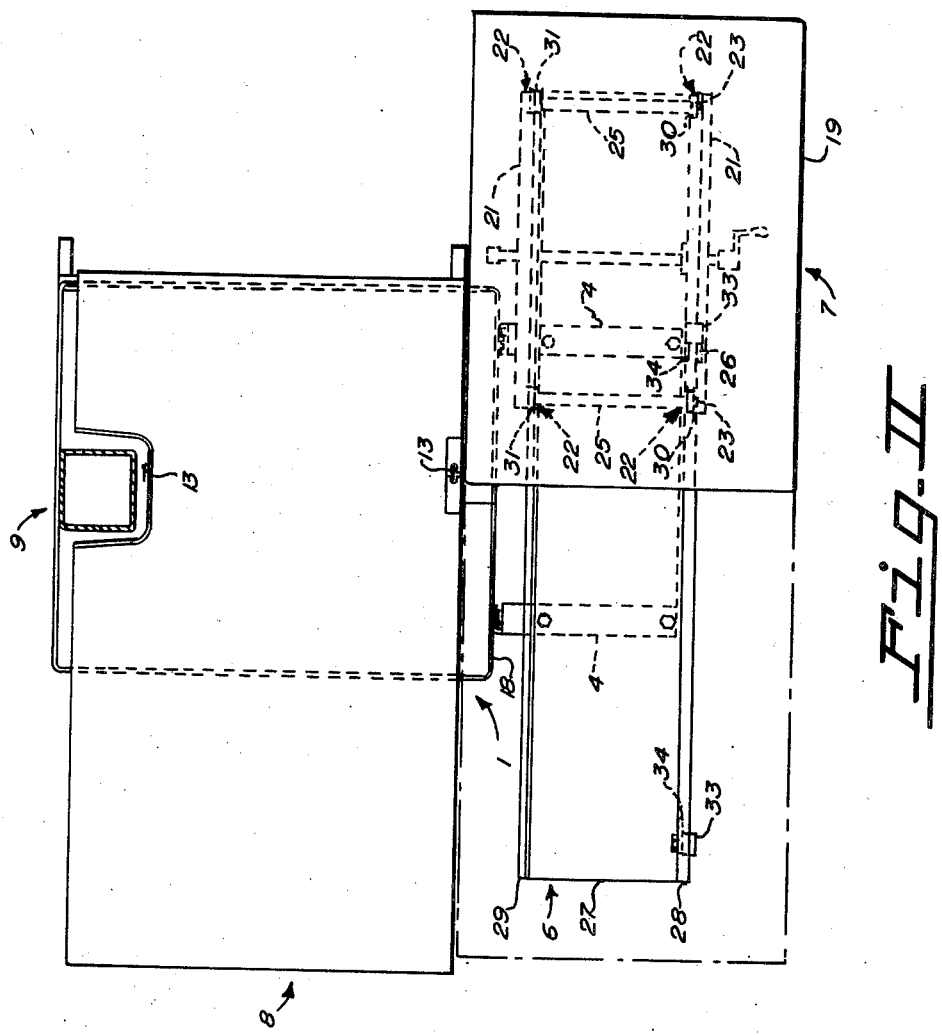

Sept. 24, 1957  J. D. BROWN  2,807,291
RECIPROCATING CARRIAGE FOR BAND SAWS
Original Filed Jan. 27, 1955  3 Sheets-Sheet 3
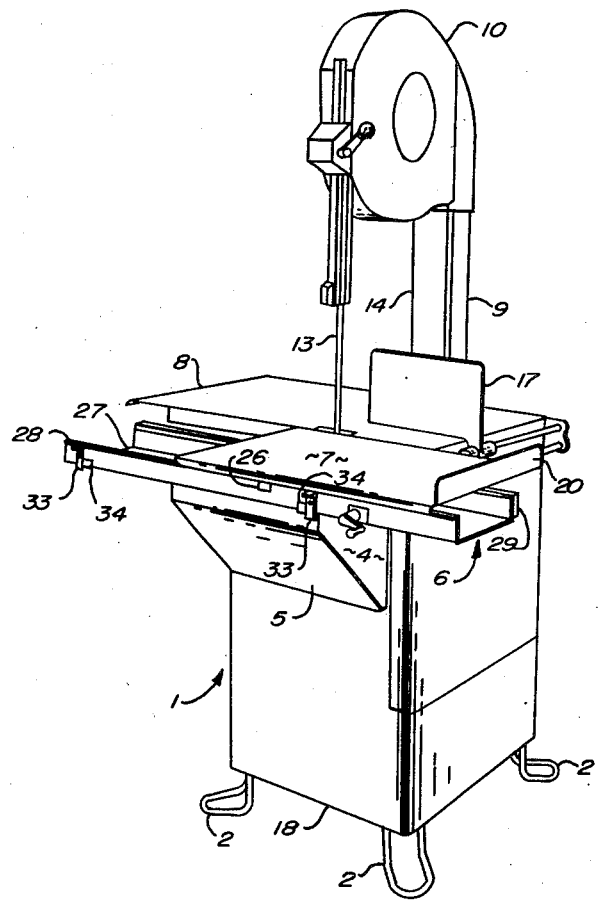
Fig. IV
INVENTOR.
JAMES D. BROWN
BY
Marshall, Marshall & Geasting
ATTORNEYS

United States Patent Office

2,807,291
Patented Sept. 24, 1957

2,807,291

RECIPROCATING CARRIAGE FOR BAND SAWS

James D. Brown, Toledo, Ohio, assignor to Toledo Scale Company, Toledo, Ohio, a corporation of New Jersey Original application January 27, 1955, Serial No. 484,369. Divided and this application December 21, 1955, Serial No. 554,512

1 Claim. (Cl. 143—25)

This invention relates generally to improvements in meat cutting band saws of the type employed in places where large quantities of meat are cut from carcass or part carcass pieces.

The principal object of this invention is to provide a meat cutting band saw having improved operating characteristics yet being of very low cost construction.

Another object of the invention is to provide, in a meat cutting band saw, a non-binding and easily movable table or reciprocating carriage for supporting the main piece of meat in such a manner as to enable it to be moved past a saw blade, the movable table and the support therefor being of low cost construction.

More specific objects and advantages are apparent from the following description of a preferred embodiment of the invention.

According to the invention, a meat cutting band saw is provided with an improved movable table or reciprocating carriage which does not bind as it moves the main piece of meat past a saw blade. The movable table is so constructed and the general arrangement of the parts of the machine is such as to greatly reduce the cost of manufacture of the meat cutting band saw.

A preferred embodiment of the invention is illustrated in the accompanying drawings.

In the drawings:

Figure I is an end elevation view of a meat cutting band saw embodying the invention, certain adjuncts being removed to reveal inner parts.

Figure II is a plan view taken substantially from the position shown by the line II—II of Figure I, part being shown in section.

Figure III is an enlarged and detailed end elevational view of a movable table as seen from the same position as the table is viewed in Figure I, parts being shown in section.

Figure IV is a perspective view of the band saw which is shown in elevation in Figure I.

These specific figures and the accompanying description are intended merely to illustrate the invention and not to limit its scope.

The meat cutting band saw, generally illustrated in Figures I and IV, has a base housing 1 erected on four short legs 2 two of which have leveling nuts 3 parallel with the bottom surfaces of the legs. Forwardly supporting bracket members 4, both of which are shown in Figure II, interconnected by means of a plate 5, are fixed to the front of the base housing 1 and carry a pair of tracks 6 on which a movable table 7 is mounted to reciprocate. The top of the base housing 1 is formed by a stationary table 8 which lies on the same plane as the movable table 7 forming with the movable table a working surface for handling the meat to be cut on the machine.

At the rear center portion of the base housing 1 there is erected to hollow vertically upstanding column 9 atop which is located a saw wheel housing 10. An upper saw wheel 11 is rotatably mounted in the saw wheel housing 10 and a lower saw wheel 12 is rotatably mounted in the base housing 1, the saw wheels 11 and 12 being identical and preferably of the crown grooved type. A continuous band saw blade 13 runs on the saw wheels 11 and 12 passing upwardly near the outer front surface of the column 9 and downwardly across a throat formed between the underside of the saw wheel housing 10 and the stationary table 8. The rearward stretch of the band saw blade 13 is enclosed by a saw guard 14 attached to the column 9. A driving motor 15 is mounted in the base housing 1 and is drivingly connected to the lower saw wheel 12 by a drive belt 16. A thickness gauge plate 17 is mounted for fore and aft movement along the right hand side of the stationary table 8 back of the cutting plane of the blade 13 so that by setting the position of the gauge plate 17 relative to the blade 13 slices of meat of desired thickness may be cut. The base housing 1 is constructed of sheet metal sections welded into a rectilinear hollow body which includes rectangular shaped back and front plates 18. One of the four legs 2 is attached to each of the lower corners of the back plate 18 and one of the legs is attached to each of the lower corners of the front plate 18.

The movable table 7 supports the main piece of meat to be cut in such a manner as to enable it to be moved past the saw blade 13. The table 7 includes a plate 19 (Figure II) having an upturned front portion 20 (Figure III) against which the meat to be cut may rest and a pair of wheel support brackets 21 fixed to its underneath side. The movable table 7 rides on four wheels 22 formed by ball bearings mounted two on each of a pair of axles 23 extending between the wheel support brackets 21, the wheels 22 being spaced from the brackets 21 by washers 24 and spaced from each other on the axles 23 by spacers 25. A fixed table stop 26 is attached to the left hand wheel support bracket 21, as viewed in Figure III, and extends downwardly below the bracket.

The movable table 7 travels across the machine on the pair of tracks 6 carried by the supporting bracket members 4 which are mounted on the front plate 18 of the base housing 1. The tracks 6 include a channel member 27 attached to the bracket members 4 and having one edge bent into a horizontally extending, track-like shelf 28 and its other edge supporting a flat surfaced bar 29 extending generally horizontal and parallel to the shelf 28. Two of the wheels 22 have flat rims 30 cooperating with the shelf 28 and the other wheels 22 have double flanged rims 31 cooperating with the top of the flat surfaced bar 29. The double flanged rims 31 function to prevent yawing movement of the movable table 7 as it travels across the machine, thus preventing binding of the table. The wheel support brackets 21 in addition to providing means for mounting the wheels 22 also have their free ends 32 bent to extend underneath the tracks 6 limiting rising movement of the movable table 7.

The construction of the movable table 7 and the support therefor permits the use of low cost materials which nevertheless produce an improved easily movable and non-binding table. It is, of course, desirable that the wheels 22 of the table be so guided as to move in a perfectly horizontal and parallel path. However, it is impossible to mass produce the movable table 7 and its support from low cost sheet metal sections of perfectly straight and aligned construction. The movable table 7 is therefore self-adjustably supported so that as the double flanged rims 31 follow the bar 29 any movement of the table 7 transverse to a straight path of movement across the machine is permitted by the flat rims 30 which can slide sidewise on the shelf 28. Also, any up or down movement of the table 7 caused by slight dips in the shelf 28 or in the bar 29 is permitted by the open relationship of the free ends 32 of the brackets 21 with the tracks 6.

Travel of the table 7 on its tracks 6 is limited by

L-shaped rockable table stops 33 mounted on an edge of the channel member 27, the rockable table stops 33 being located adjacent stationary plates 34 (Figures II and IV) fixed to the edge of the channel member 27. When the rockable table stops 33 are turned to their upright positions (Figures III and IV), the tops of the L-shaped rockable stops 33 obstruct the path of the fixed table stop 26 attached to the left hand wheel support bracket 21. At the same time, the L-shaped rockable stops 33 are prevented from being turned past their upright positions through contact of the fixed table stop 26 by the adjacent stationary plates 34. However, the stationary plates 34 do not prevent clockwise rotation of the left hand (as viewed in Figures II and IV) rockable table stop 33 or counterclockwise rotation of the right hand rockable table stop 33 by finger pressure. Travel of the table 7 on its tracks 6 from the position shown in solid lines in Figure II to the position shown in broken lines in Figure II permits a full sweep of any meat carried on the table 7 past the saw blade 13. Travel of the table is limited by the L-shaped rockable table stops 33 in their upright positions. When the table stops 33 are pivoted from their upright positions to horizontal positions by finger pressure as hereinbefore described, the path of the fixed table stop 26 is no longer obstructed and the table 7 can be removed from either end of its tracks 6.

The embodiment of the invention that has been disclosed may be modified to meet various requirements.

This application is a division of application Serial No. 484,369 filed January 27, 1955.

Having described the invention, I claim:

In combination, a base, a meat cutting band saw, a sheet metal channel having a pair of substantially parallel, upturned flanges, said flanges being generally parallel to the plane of said saw, a metal bar forming a first track secured to a first of said flanges most proximate to said saw and having an uppermost horizontal edge essentially parallel to the plane of said saw, said second flange having an uppermost edge forming a second track essentially in the same horizontal plane as said bar edge, a sheet metal table movable along a path paralleling the plane of said saw, a pair of double-flanged-rim wheels mounted on the undersurface of said table on a first side of said table adjacent said saw, said flanged wheels riding on said metal bar and having their flanges straddle the upper edge of said bar, a pair of flat wheels mounted on the undersurface of said table more remote from said first side of said table than said flanged wheels and riding on said second flange, hooked members carried by said table and having free ends underneath said tracks, a fixed stop member projecting from the undersurface of said table, and a pair of selectively positionable stop members that are on the track for limiting the travel of the table by engagement with said fixed stop member, and that are movable by finger pressure toward each other from positions obstructing said fixed stop member to non-obstructing positions whereby the table can be removed from either end of the tracks.

References Cited in the file of this patent

UNITED STATES PATENTS

| | | |
|---|---|---|
| 1,038,544 | Ensign | Sept. 17, 1912 |
| 1,499,124 | Reichmann | June 24, 1924 |
| 1,499,756 | Street | July 1, 1924 |
| 1,803,489 | Schueren | May 5, 1931 |
| 2,059,595 | McKeage | Nov. 3, 1936 |
| 2,062,969 | Dutcher | Dec. 1, 1936 |
| 2,601,878 | Anderson | July 1, 1952 |

FOREIGN PATENTS

| | | |
|---|---|---|
| 93,869 | Switzerland | Apr. 1, 1922 |